United States Patent
Steffens et al.

(10) Patent No.: US 8,718,125 B2
(45) Date of Patent: May 6, 2014

(54) APPARATUS AND METHOD FOR DETERMINING AND REPRESENTING A SYNCHRONIZATION STATUS

(75) Inventors: Johannes Steffens, Rosenheim (DE); Volker Fischer, Munich (DE); Gregor Feldhaus, Munich (DE); Matthias Roth, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1348 days.

(21) Appl. No.: 12/521,512

(22) PCT Filed: Dec. 11, 2007

(86) PCT No.: PCT/EP2007/010818
§ 371 (c)(1),
(2), (4) Date: Jun. 26, 2009

(87) PCT Pub. No.: WO2008/083807
PCT Pub. Date: Jul. 17, 2008

(65) Prior Publication Data
US 2010/0316106 A1 Dec. 16, 2010

(30) Foreign Application Priority Data

Jan. 10, 2007 (DE) .......................... 10 2007 001 577
Apr. 16, 2007 (DE) .......................... 10 2007 017 838

(51) Int. Cl.
*H04B 3/46* (2006.01)
*H04B 17/00* (2006.01)

(52) U.S. Cl.
USPC ........................................................ 375/228

(58) Field of Classification Search
USPC ................................ 375/228, 224; 455/67.11
See application file for complete search history.

(56) References Cited

U.S. PATENT DOCUMENTS

| | | | | |
|---|---|---|---|---|
| 5,156,152 A * | 10/1992 | Yamazaki et al. | | 600/454 |
| 5,572,515 A | 11/1996 | Williamson et al. | | |
| 5,761,242 A | 6/1998 | Thomas | | |
| 8,239,448 B2 * | 8/2012 | Lo et al. | | 709/203 |
| 2005/0276249 A1* | 12/2005 | Damnjanovic et al. | | 370/335 |
| 2007/0030351 A1* | 2/2007 | Blanco et al. | | 348/148 |

FOREIGN PATENT DOCUMENTS

| | | | |
|---|---|---|---|
| EP | 1172982 A2 | | 1/2002 |
| EP | 1249953 A1 | | 10/2002 |
| EP | 1463222 | * | 9/2004 |
| EP | 1463222 A2 | | 9/2004 |

(Continued)

OTHER PUBLICATIONS

International Preliminary Report on Patentability, PCT/EP2007/010818, Aug. 13, 2009, pp. 1-12.

(Continued)

*Primary Examiner* — Chieh M Fan
*Assistant Examiner* — Brian J Stevens
(74) *Attorney, Agent, or Firm* — Dittahovong Mori & Steiner P.C.

(57) ABSTRACT

A device and method for determining and displaying on a display element the status of at least one synchronization implemented in an electronic measuring instrument or a telecommunications device is provided. The device includes several functional units provided within the electronic measuring instrument or the telecommunications device, and each functional unit determines at least one parameter, the value of which corresponds to the status of the synchronization implemented in the respective functional unit.

28 Claims, 1 Drawing Sheet

(56) References Cited

FOREIGN PATENT DOCUMENTS

| WO | 9528048 | A1 | 10/1995 |
| WO | 03003644 | A1 | 1/2003 |
| WO | 03034644 | A1 | 4/2003 |
| WO | 2006000091 | A1 | 1/2006 |
| WO | WO 2006123584 | A1 * | 11/2006 |

OTHER PUBLICATIONS

WO 2008/083807 A1, International Search Report, May 30, 2008, pp. 27-32.
EP 1463222 A3, International Search Report, Apr. 7, 2006, pp. 1-4.

* cited by examiner

US 8,718,125 B2

APPARATUS AND METHOD FOR DETERMINING AND REPRESENTING A SYNCHRONIZATION STATUS

CROSS-REFERENCE TO RELATED APPLICATION

The present application is a national phase application of PCT Application No. PCT/EP2007/010818, filed on Dec. 11, 2007, and claims priority to German Application No. 10 2007 001 577.3, filed on Jan. 10, 2007, and German Application No. 10 2007 017 838.9, filed on Apr. 16, 2007, the entire contents of which are herein incorporated by reference.

BACKGROUND OF THE INVENTION

1. Field of the Invention

The invention relates to a device and a method for the determination and display of a status of at least one synchronization implemented in an electronic measuring instrument or telecommunications device.

2. Discussion of the Background

International application WO 03/034644 A1 describes a method and a device for reducing the number of pilot symbols of a multiple-input multiple-output (MIMO) OFDM communications system and a method and a device for channel estimation or respectively for estimating the transmission function within a system of this kind. For every transmission antenna in an OFDM radio transmitter, the pilot symbols are coded in such a manner that they have a one-to-one correspondence with the transmission antenna. The coded pilot symbols are then inserted into an OFDM frame, where they each form one structure per transmission antenna. The structures of various transmission antennae, which transmit on the same frequencies, each provide an offset (offset), which amounts to one symbol on the time axis. In the OFDM receiver, a channel estimation is implemented in each case for a given symbol, which is disposed respectively in the center of such a structure, wherein a two-dimensional interpolation is used. The estimated transmission synchronization is smoothed in the frequency domain.

The disadvantage with the method described in WO 03/034644 A1 and respectively with the device presented therein, is that no monitoring unit, which respectively analyzes and evaluates a synchronization status of an individual procedural stage, is provided; accordingly, for the maintenance and care of the MIMO-OFDM communications system described in WO 03/034644 A1, no tool is available for the rapid and reliable localization and repair of any occurring error synchronization or respectively any failure in the synchronization of an intermediate step.

SUMMARY OF THE INVENTION

The invention advantageously provides a device and a method, with which a synchronization-monitoring can be implemented in a measuring instrument or a telecommunications device.

A device for the determination and display on a display element of a status of at least one synchronization implemented in an electronic measuring instrument or telecommunications device is provided. The device includes several synchronization units provided within the electronic measuring instrument or telecommunications device, wherein, in each case, a synchronization unit or monitoring unit determines the various parameters relating to the respective function or synchronization, of which the values correspond to the status of the synchronization implemented in the electronic measuring instrument or telecommunications device, and provides the maintenance or development personnel with an appropriate evaluation tool, with which any error or fault occurring can be reliably detected so that appropriate steps can be taken for the repair of the error or fault.

Also, a method is provided that is used for the determination and display on a display element of a status of at least one synchronization implemented in an electronic measuring instrument or telecommunications device and comprises several procedural stages implemented by different synchronization units or functional units. Each synchronization unit or functional unit determines different parameters relating to the respective synchronization, of which the values indicate a probability for a given synchronization status. In this context, the user is presented with a visualization regarding whether the synchronization implemented in the electronic measuring instrument or telecommunications device is successful or unsuccessful.

The advantages achieved by the invention consist especially in that an effective tool is provided for the analysis of a complex overall system, for example, of an electronic measuring instrument with several sub-systems, which are dependent upon one another. In this context, it is advantageous that the overall system can be diagnosed in its sub-systems, which prevents a costly fault finding, because a fault is identified and repaired at the point of occurrence.

Furthermore, it is advantageous that the complex structure, for example, of the electronic measuring instrument, is imaged on the display element of the device in such a logically-arranged manner that the user can rapidly gain an overview of the ongoing or completed processes, wherein a serial arrangement of several blocks on the display element corresponds with the time sequence of the tasks or synchronizations to be worked through.

Moreover, in visualizing the chronology of the processes, it is advantageous to connect the individual blocks on the display element with arrows.

Furthermore, it is advantageous if the blocks on the display element adopt a first color status or a second color status, wherein a first color status signals to the user a successfully-completed synchronization. By contrast, a second color status signals an unsuccessfully-implemented synchronization. A third color status, which corresponds to the status "not-precisely-defined" or to the status "neither successfully nor unsuccessfully, i.e. without unambiguous result" of an implemented synchronization, which may also provide an ambiguous result, can also be advantageously realized.

Moreover, the arrows, which connect together the individual blocks on the display element, also advantageously adopt two different color statuses, wherein a first color status of an arrow represents a sequence of the successfully-implemented synchronization by the preceding functional units, and a second color status displays or visualizes for the user a synchronization implemented unsuccessfully by the preceding functional units or synchronization units.

Furthermore, it is advantageous to provide within the blocks a bar diagram, which includes a scale with, for example, at least two but especially three value fields, wherein one value field corresponds to one color status. The three value fields of this bar diagram correspond to three confidence-value ranges and are separated by two threshold values, wherein a confidence value indicates a probability for the occurrence of a synchronization status of the associated functional unit or synchronization unit. Accordingly, the development engineer can readily estimate whether and at which position of the receiver-end communications path a synchronization error or similar fault has occurred.

Furthermore, it is advantageous if the development engineer can mark a block on the display element with the mouse function or respectively by means of a previously-determined key-stroke combination and obtain by double-clicking this marked block more detailed information about various measured values or parameters relating to the synchronization of the selected block or the selected functional unit.

In an expedient further development, the method relates in a special manner, but not exclusively, to an OFDM receiver, wherein the received signals are subjected to several detection stages or synchronization stages.

An exemplary embodiment of the present device and of the method compatible with the latter is described below. However, the logical structure and also the method of operation or the use of the invention, especially of the method according to the invention and its advantages as listed above are both best understood with reference to the following description in conjunction with the associated drawings.

DETAILED DESCRIPTION OF EXEMPLARY EMBODIMENTS OF THE INVENTION

Figure 1:
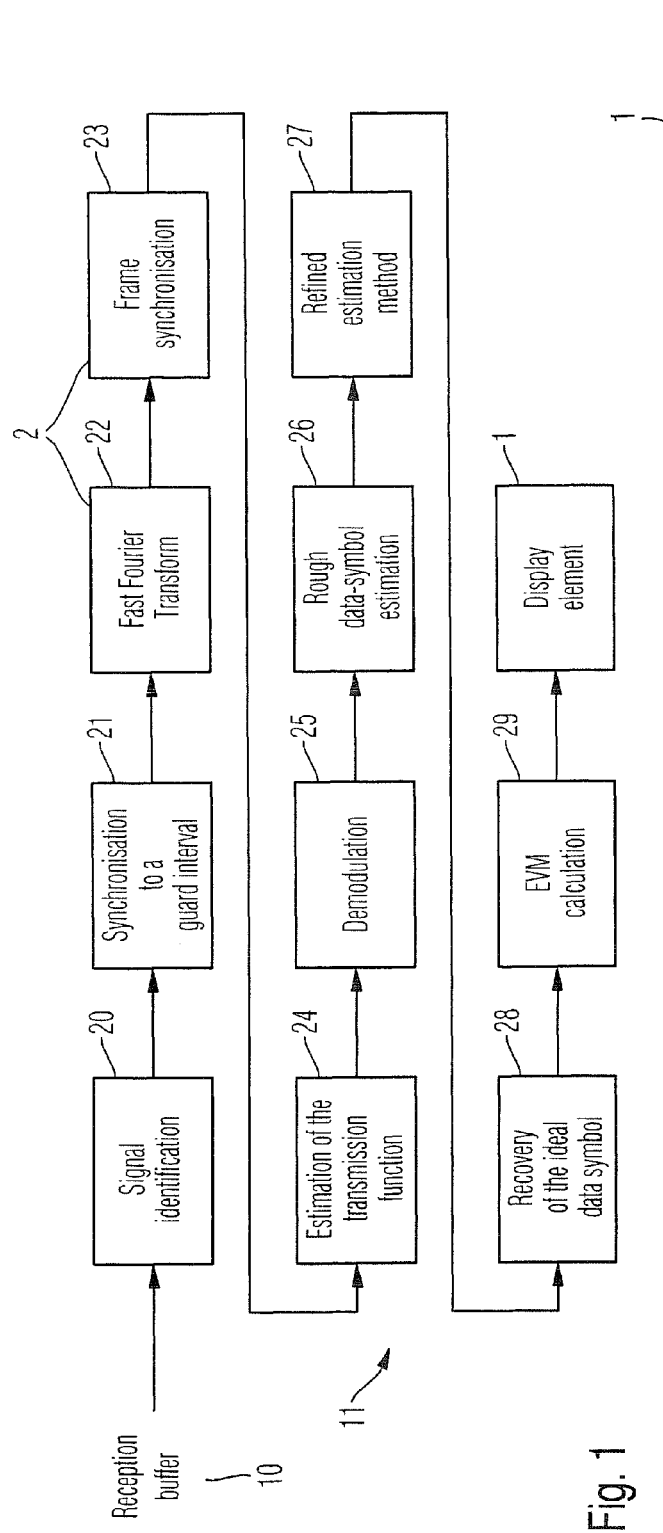
FIG. 1 shows the receiver-end process chain of an OFDM receiver.

FIG. 1 shows the functional units of an OFDM receiver, on which the method according to an embodiment of the invention or respectively the device according to an embodiment of the invention is used.

The method is used for the determination and display on a display element 1 of the associated device of a status of at least one synchronization implemented in an electronic measuring instrument or in the test receiver. The method comprises several procedural stages implemented by different synchronization units or functional units 2, wherein each functional unit or synchronization unit 2 determines at least one parameter, the value of which corresponds to a probability for a given status of the synchronization implemented in the functional unit 2.

The following description of the method relates to an OFDM test receiver, from the reception buffer 10 of which a content is read out in the first procedural stage, which corresponds to a noise-laden, band-pass useful signal.

In the second procedural stage, the content of the reception buffer 10, that is to say, the noise-laden baseband useful signal, is subjected to a signal identification in a first functional unit 20.

The third procedural stage assumes that the signal or respectively the signal sequence has been identified. The identified signal sequence is then subjected, in a second functional unit 21, to a cyclic prefix synchronization (CP cyclic prefix-synchronization) with regard to a cyclically-repeated signal portion, in this case, the guard interval (guard interval).

In the fourth procedural stage, the signal is subjected to a fast Fourier transformation (Fast Fourier Transformation FFT) in a third functional unit 22, from which the Fourier-transformed signal (FFT-signal) is obtained.

In the fifth procedural stage, the Fourier-transformed signal is subjected to a frame-synchronization in a fourth functional unit 23, from which a frame-synchronous FFT signal is obtained. In this context, the shape of the frame is known to the OFDM receiver.

In the sixth procedural stage, a channel estimation is implemented in a fifth functional unit 24 by means of the frame-synchronous FFT signal. In this context, the noise-laden pilot symbol, which is present at a defined position known to the receiver within the frame localized in the fifth procedural stage, is compared with an error-free pilot symbol. From this comparison, inferences can then be drawn regarding the estimated transmission function of the radio channel to be used for the equalization of the received signal.

The seventh procedural stage relates to the fact that, in a sixth functional unit 25, the frame-synchronous FFT signal, which has been equalized by means of the previously-estimated transmission function, is demodulated with a demodulation method specified in the receiver. Such a demodulation method is, for example, 64-QAM-modulation with 6 bits per symbol. However, other digital modulation methods can be used.

In the eighth procedural stage, a rough estimation of the transmitted signal or respectively of the transmitted data symbol is implemented in a seventh functional unit 26.

The data symbol roughly-estimated in the eighth procedural stage is then subjected in the subsequent, ninth procedural stage to a refined estimation method in an eighth functional unit 27, so that, after the implementation of the rough estimation method and of the refined estimation method, the data symbol is recovered in a ninth functional unit 28, which is subjected in the tenth procedural stage to an EVM (Error Vector Magnitude) calculation in tenth functional unit 29.

In the eleventh and final procedural stage, the ideal, recovered data symbol is displayed according to the analysis on the display element 1 of the device.

Figure 2:
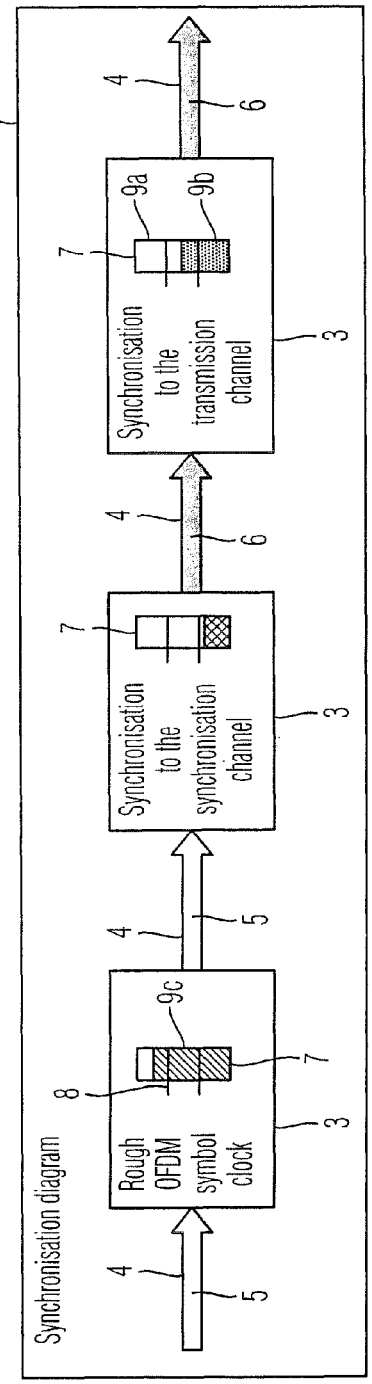
FIG. 2 shows the display element of an exemplary embodiment of the device according to the invention.

FIG. 2 shows the display element 1 of one exemplary embodiment of the device according to the invention.

The is used for the determination and display on a display element 1 of the status of at least one synchronization implemented in an electronic measuring instrument or telecommunications device. As explained, the device comprises several functional units 20-29 provided within the electronic measuring instrument, wherein many functional units 21, 23, 25, 26, 27 determine at least one parameter, the value of which indicates the status of the synchronization implemented in the functional unit.

The individual functional units 20-29 of the device are arranged in the electronic measuring instrument in series or nested within one another, wherein they fulfil different tasks, which are implemented—as described above—in a defined time sequence.

As an alternative, in a further exemplary embodiment, the functional units 2 are arranged within the measuring instrument or telecommunications device in different branches and also fulfil different tasks. Branches are advantageous, if given signal paths can be connected or disconnected or if two independent analysis methods are used simultaneously on the same data.

In each case, a synchronization unit 2 of the electronic measuring instrument or telecommunications device corresponds to a block 3 on the display element 1 of the device, wherein a serial arrangement of several blocks 3 on the display element 1 corresponds to the time sequence of the tasks to be fulfilled or of the processes of the functional units 20-29 to be worked through.

In general, the functional units are marked with the reference number 2 and additionally with a special reference number 20, 21, 22, 23, 24, 25, 26, 27, 28 or 29 corresponding respectively to the function explained above. Only some of the functional units implement a synchronization. In the exemplary embodiment presented in FIG. 1, these are functional unit 21 with the synchronization to the guard interval; functional unit 23 with the frame synchronization; functional unit 24, which must also be synchronized for the estimation of the frequency offset, the time offset and the phase offset; the functional unit 25 for the demodulation; and functional unit 27 for the implementation of the fine estimation on the basis of reference data (Data Aided Estimation).

According to embodiments of the invention, those functional units, which must implement a synchronization are visualized on the display element 1 by corresponding blocks 3, wherein informative blocks are also presented, for example, the FFT operation, which does not return a metric or a status. These informative blocks allow the user an improved localization of the fault or contribute to an improved understanding of the overall process of the synchronization implemented in an electronic measuring instrument or telecommunications device.

These informative blocks or information blocks on the display element present, for example, an FFT (Fast Fourier Transformation) or an IFFT (inverse Fast Fourier Transformation), wherein an information block can adopt a fourth color status.

The blocks 3 on the display element 1 of the device are connected with arrows 4, so that the chronology of the synchronization processes is clearly visible to the development engineer.

Furthermore, the blocks 3 on the display element 1 can adopt a first color status or a second color status, wherein the first color status of a block 3 displays a result of the successfully-implemented synchronization corresponding to the block 3.

The second color status, for example, red, of a block 3 displays a result of the unsuccessfully implemented synchronization corresponding to the block 3.

The arrows 4, which connect the blocks 3, adopt a first color status 5, a second color status 6 or a third color status, wherein the first color status 5, for example, green, of an arrow 4 represents a successful sequence of synchronizations implemented by the functional units 2 of the preceding blocks 3.

The second color status 6 of an arrow 4 represents an unsuccessful synchronization in the sequence of the functional units 2 represented by the preceding blocks 3.

A bar diagram 7 with a scale 8, which comprises three value fields 9a, 9b, 9c, is provided within each of the blocks 3, wherein the three value fields 9a, 9b, 9c represent three different confidence-value ranges, and a confidence value (Confidence Value) indicates a probability for the occurrence of the synchronization status with this value.

In the case of the first block illustrated in FIG. 2, the upper threshold value has been exceeded and, accordingly, a high confidence value (Confidence Value) is shown, that is to say, the synchronization of the functional unit corresponding to this block, for example, the functional unit 21 for the synchronization to the guard interval, can be trusted with a high probability. According to one preferred exemplary embodiment, the scale can therefore be colored green. In the block 3 illustrated in FIG. 2 in the middle position, the synchronization fails, that is to say, the confidence value (Confidence Value) is smaller than the lower threshold value. Alongside a red coloring of the block, this can be additionally indicated in that the scale is colored red. In the block illustrated on the right in FIG. 2, the synchronization is satisfactorily reliable, which is indicated in that the confidence value (Confidence Value) is disposed on the scale between the lower and upper threshold value. For increased clarity, the scale can be colored yellow in this case.

In the exemplary embodiment, the device provides that a selection of a block 3 and a subsequent activation of the selected block 3 on the display element 1 reproduces a detailed item of information on the determined status regarding the implemented synchronization, wherein the activation of the selected block 3 on the display element 1 is implemented by means of a mouse function or by means of a previously-programmed key-stroke combination.

The activation of the selected block is implemented in an additional exemplary embodiment of the device according to the invention by means of a remote control command, for example, by means of a SCPI command via a GPIB interface or via a LAN interface.

The invention is not restricted to the exemplary embodiment illustrated in the drawings. In particular, the method according to the invention is not restricted to an OFDM receiver, but can also be used for future communications systems or sub-systems of existing or future communications system. All of the features described above and illustrated in the drawings can be combined with one another as required.

The invention claimed is:

1. A device for the determination and display of synchronization statuses of a receiver-end communications path in an electronic measuring instrument or telecommunications device, comprising:
    a plurality of synchronization stages; and
    a display element,
    wherein a received signal is subjected to the plurality of synchronization stages in a defined time sequence and the electronic measuring instrument or telecommunications device comprises a corresponding synchronization unit for each synchronization stage to be implemented,
    wherein each synchronization unit is adapted for determining at least one parameter, the at least one parameter indicating the synchronization status of the corresponding synchronization unit, the indicated synchronization status is one of a plurality of possible synchronization statuses, and the plurality of possible synchronization statuses comprises a successful synchronization status and an unsuccessful synchronization status,
    wherein the device is adapted for displaying on the display element, based on the parameters, the synchronization statuses of the synchronization units along the receiver-end communication path,
    wherein the display element displays a plurality of blocks and each block on the display element represents a synchronization unit of the measuring instrument or telecommunications device, and
    wherein one block on the display element represents an FFT (Fast Fourier Transformation) or an IFFT (inverse Fast Fourier Transformation).

2. The device according to claim 1, wherein the device is adapted to the electronic measuring instrument or telecommunication device comprising an OFDM (Orthogonal Frequency-Division Multiplexing) receiver.

3. The device according to claim 1, wherein the synchronization units are disposed in different branches within the measuring instrument or telecommunications device and fulfill different tasks.

4. The device according to claim 3, wherein the different tasks are implemented in the defined time sequence.

5. The device according to claim 1, wherein a serial arrangement of several blocks on the display element corresponds to the defined time sequence.

6. The device according to claim 1, wherein the plurality of blocks on the display element are connected by arrows.

7. The device according to claim 6, wherein the arrows, which connect the plurality of blocks, adopt a first color status, a second color status or a third color status.

8. The device according to claim 7, wherein the first color status of an arrow represents a successful succession of synchronizations implemented by the synchronization units of the preceding blocks.

9. The device according to claim 8, wherein the second color status of an arrow represents a synchronization unsuccessfully implemented by the synchronization units of the preceding blocks.

10. The device according to claim 1, wherein the plurality of blocks on the display element adopt a first color status or a second color status dependent upon the respective status of each block.

11. The device according to claim 10, wherein the first color status of a block displays a result of a successfully-implemented synchronization corresponding to the block.

12. The device according to claim 11, wherein the second color status of a block displays a result of an unsuccessfully-implemented synchronization corresponding to the block.

13. The device according to claim 1, wherein a bar diagram with a scale is provided within each of the blocks.

14. The device according to claim 13, wherein the scale provides at least two value fields.

15. The device according to claim 14,
wherein three value fields represent three different confidence-value ranges, and
wherein a confidence value indicates a probability for the occurrence of a status of the synchronization of the associated synchronization unit.

16. The device according to claim 1, wherein, through a selection of a block and a subsequent activation of the selected block on the display element, a detailed item of information regarding the determined status with reference to the synchronization implemented by the synchronization unit, which corresponds to the selected block, is reproduced.

17. The device according to claim 16, wherein the activation of the selected block on the display element is implemented via a mouse, a previously-programmed key-stroke combination, or a remote control command implemented via a GPIB (General Purpose Interface Bus) interface or via a LAN (Local Area Network) interface.

18. A method for the determination and display of synchronization statuses of a receiver-end communications path in an electronic measuring instrument or telecommunications device comprising:
subjecting a received signal to a plurality of synchronization stages in a defined time sequence, wherein the electronic measuring instrument or telecommunications device comprises a corresponding synchronization unit for each synchronization stage to be implemented,
adapting each synchronization unit for determining at least one parameter, wherein the parameter indicates the synchronization status of the corresponding synchronization unit, the indicated synchronization status is one of a plurality of possible synchronization statuses, and the plurality of possible synchronization statuses comprises a successful synchronization status and an unsuccessful synchronization status, and
displaying on the display element, based on the parameters, the synchronization statuses of the synchronization units along the receiver-end communication path
wherein the received signal is content read out from a reception buffer of an OFDM (Orthogonal Frequency-Division Multiplexing) receiver,
wherein the content of the reception buffer is subjected to a signal identification, the result of which is an identified signal sequence,
wherein the identified signal sequence is subjected to a cyclic prefix synchronization with regard to a cyclically-repeated signal portion, especially a guard interval, and
wherein a useful portion of the identified signal sequence is disposed between two such signal portions.

19. The method according to claim 18, wherein the useful portion of the identified signal sequence is extracted from the cyclic prefix synchronization.

20. The method according to claim 18, wherein the useful portion of the identified signal sequence is subjected to a Fast Fourier Transformation (FFT), from which a Fourier-transformed signal is obtained.

21. The method according to claim 20, wherein the Fourier-transformed signal is subjected to a frame synchronization, from which a frame-synchronous Fourier-transformed signal is obtained.

22. The method according to claim 21,
wherein a channel estimation is implemented using the frame-synchronous Fourier-transformed signal, and
wherein every noise-laden pilot symbol transmitted within a now-known frame is compared with a pilot symbol, which is present at the receiver end without transmission error.

23. The method according to claim 22, wherein a transmission function for a radio channel is estimated from a result of a comparison of two pilots symbols.

24. The method according to claim 23, wherein the frame-synchronous Fourier-transformed signal, equalized by means of the estimated transmission function, is demodulated with a demodulation method specified in the receiver.

25. The method according to claim 24, wherein a transmitted signal or transmitted data symbol is roughly estimated on a basis of a previously-defined threshold value.

26. The method according to claim 25, wherein the roughly-estimated data symbol is subjected to a refined estimation process.

27. The method according to claim 26, wherein, through implementation of the rough and the refined estimation method, in each case, a recovered data symbol is further processed.

28. The method according to claim 27, wherein every recovered data symbol is displayed after an analysis on the display element.

* * * * *